Patented Sept. 4, 1923.

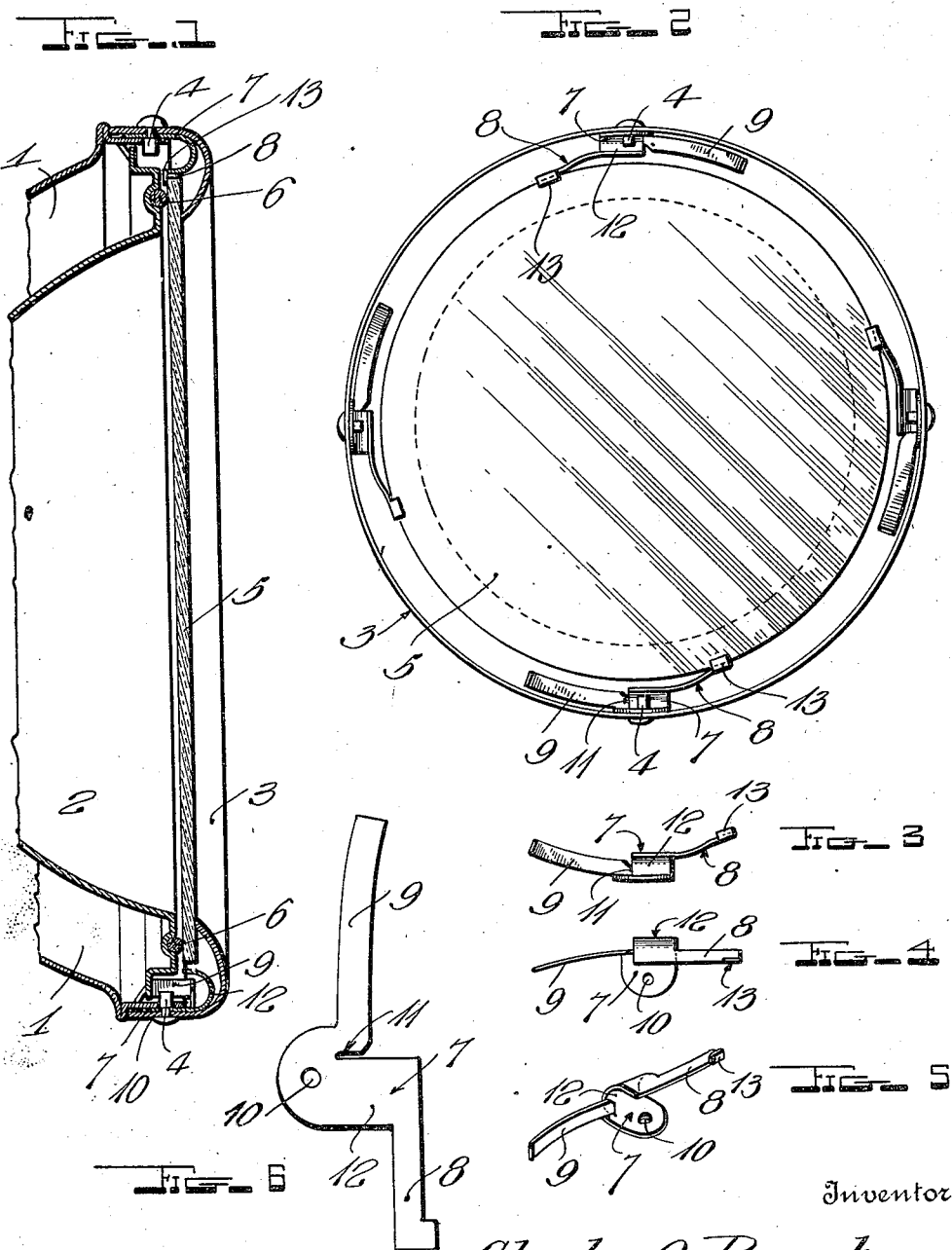

1,466,944

UNITED STATES PATENT OFFICE.

CHARLES ORAH BAUGHN, OF BELLEVILLE, ARKANSAS.

HEADLIGHT-LENS HOLDER AND ANTIRATTLER.

Application filed September 11, 1922. Serial No. 587,491.

*To all whom it may concern:*

Be it known that I, CHARLES ORAH BAUGHN, a citizen of the United States, residing at Belleville, in the county of Yell and State of Arkansas, have invented certain new and useful Improvements in Headlight-Lens Holders and Antirattlers; and I do declare the following to be a full, clear, and exact description of the invention, such as will enable others skilled in the art to which it appertains to make and use the same.

My invention has for its object to provide a simple and inexpensive, yet a highly efficient and desirable device for holding automobile headlight lenses against the rims of the headlight casings and for holding said rims and lenses against rattling, as well as against accidental displacement.

A further object is to provide a device of the character set forth which may be attached to the headlight rim by the usual inwardly extending studs thereon, which studs co-operate with bayonet slots in the headlight casing to secure the rim in place.

With the foregoing in view, the invention resides in the novel subject matter hereinafter described and claimed, the description being supplemented by the accompanying drawings.

Figure 1 is an enlarged detail section disclosing the improved lens holder and antirattler in position on an automobile headlight.

Figure 2 is an elevation showing the invention detached and looking toward the inner face thereof.

Figure 3 is an elevation of the spring metal member.

Figure 4 is a top plan view thereof.

Figure 5 is a detail perspective view.

Figure 6 is an enlarged top plan view of the metal blank from which the member is formed.

In the drawings above briefly described, the numeral 1 designates a well known form of headlight casing enclosing the usual reflector 2 and provided with a removable rim 3 having inwardly extending studs 4 which engage bayonet slots in the casing to retain the rim in place. As usual, the lens 5 is received between the rim 3 and the front end of the reflector 2, the latter being provided with a packing 6 which usually constitutes the sole means for holding the lens yieldably against the rim. All of these parts are well known and are merely shown to illustrate the application of my invention.

Secured to the inner side of the rim 3, by the studs 4, are a suitable number of U-shaped members 7, each having oppositely extending arms 8 and 9, the several arms 8 being adapted to yieldably grip the edge of the lens 5 to yieldably hold the latter in proper centered position, while the arms 9 curve rearwardly and bear against the front end of the reflector 2 to hold the lens 5 tightly against the rim 3 and prevent rattling of both said lens and rim, and the forward stress exerted by the springs tends to retain the studs 4 properly engaged with the bayonet slots.

In the preferred form of construction, each member 7 and its arms 8 and 9 are stamped from a single sheet of spring metal. The blank before it is bent into shape is shown clearly in Fig. 6. From this view, it will be seen that the part 7 is formed with an opening 10 near one edge to receive one of the studs 4 and is also formed with a split 11 leading toward said opening from its opposite edge. At one side of the split 11, the metal extends beyond the metal at the opposite side of the split, as indicated by the numeral 12 and this portion 12 is integral with the lens-holding arm 8 which is provided on its free end with a lug 13 which, when bent at right angles to the arm 8, engages the inner side of the lens as shown in Fig. 2. As the portion 12 is bent substantially upon itself to form the aforesaid U-shaped part, the inner end portion of the arm 8 is disposed in substantially parallel relation with respect to it and the necessary curvature is imparted to said arm 8 to permit proper engagement thereof with the lens.

The metal at the side of the split 11, opposite the portion 12, is integral with the lateral arm 9 and the latter is bent so that it is at right angles to the opposed walls of the U, so that when the arm 9 is given the proper curvature, it may yieldably engage the front portion of the reflector in the manner above set forth.

By constructing the device in or substantially in the manner shown and described, it will be simple and inexpensive, yet will be efficient and in every way desirable. I therefore prefer to follow these details of construction, but within the scope of the invention as claimed, numerous minor changes may be made.

I claim:

1. A device of the class described comprising a single metal stamping embodying a relatively wide central portion having resilient arms extending from it in opposite directions, said central part being bent upon itself to form a U-shaped attaching member, one of said arms being disposed in the same plane with one wall thereof, said arm being bent at its free end to engage a lens, and the other arm being bowed longitudinally and bent to extend at right angles to said wall.

2. A device of the class described comprising a spring metal member having an opening near one edge to receive a fastener for attaching it to a headlight rim; said member being split from its opposite edge toward said opening and having integral lens-holding and anti-rattling arms extending from the metal at opposite sides of the split respectively; the metal at one side of said split being bent toward the opening in the member to place the inner end of the lens-holding arm in approximately parallel relation with the body of the member; the metal at the other side of the split being bent to dispose the sides of the anti-rattling arm at substantially right angles to the member.

In testimony whereof I have hereunto affixed my signature.

CHARLES ORAH BAUGHN.